May 13, 1969      E. S. YATES      3,444,407

RIGID CONDUCTOR BARS IN DYNAMOELECTRIC MACHINE SLOTS

Filed July 20, 1966

*INVENTOR.*
EDWARD S. YATES

BY *James E. Davis Jr.*

HIS ATTORNEY

United States Patent Office 3,444,407
Patented May 13, 1969

3,444,407
RIGID CONDUCTOR BARS IN DYNAMOELECTRIC MACHINE SLOTS
Edward S. Yates, Fultonville, N.Y., assignor to General Electric Company, a corporation of New York
Filed July 20, 1966, Ser. No. 566,623
Int. Cl. H02k *3/36, 3/12*
U.S. Cl. 310—215     3 Claims

ABSTRACT OF THE DISCLOSURE

Insulated conductor bars are retained in the slots by resilient supporting means bearing against the conductor insulation on at least three sides of each bar. The supporting means include an adhesive elastomeric material. The elastomeric material is disposed between the bottom of the slot and the bottom insulated conductor, between the bottom and top conductors, between the top conductor and the wedge, and between one side of each conductor and the corresponding side of the slot. A fillet of elastomeric material is advantageously disposed at the intersection of the conductors and the core slot at the top, in the case where the conductors are positioned vertically, to provide an additional resilient restraint against dropping of the conductors in the slots.

---

This invention relates to the armature winding assembly of large dynamoelectric machines and, more particularly, pertains to means for securing armature conductor bars within corresponding slots in the cores of such machines.

The invention most closely concerns large hydroelectric machines and will be illustrated in this environment for convenience, although it will become apparent that most aspects of the present invention have wider utility. The armature of hydroelectric machines is the relatively stationary member, or stator. The stator is of laminated construction and the armature conductors are positioned in longitudinal slots circumferentially spaced about a rotor-receiving bore. The slots and conductors are of generally rectangular cross section and both extend vertically in the most typical case. Usual practice calls for two conductor coil sides per slot.

Conductors have heretofore been merely positioned in the slots and held therein by means of wedges driven into longitudinally extending key grooves adjacent the top of the slots, or opening into the bore. This simple assembly was satisfactory because the conductor insulation was fabricated from materials which are relatively pliable and can be molded under heat to conform tightly to the slot configuration.

In many applications it is now desirable to use a hard, rigid, thermoset conductor insulation in the interests of improving machine performance and efficiency. A conductor bar having hard, rigid, thermoset insulation does not conform to the dimensions of the slot in which it is placed even under the influence of elevated temperature. Voids, or air spaces, inevitably exist to a considerable extent and create a mechanical looseness and an undesirable heat transfer barrier between the conductor and core. Additionally, the stresses, shrinkages, distortions and vibrations that result from normal operation may tend to damage loose conductors in contact with the laminated steel core slots. Also, loose bars which are disposed vertically may tend to move downwardly in the slots under certain conditions.

Accordingly, it is a primary object of this invention to provide means for securing armature conductors, having hard, thermoset insulation, in the slots of a stator core.

Another object of this invention is to restrain conductor bars, having hard, thermoset insulation, within their respective armature slots.

Briefly, in accord with a preferred embodiment of this invention, insulated conductor bars are retained in the slots by resilient supporting means bearing against the conductor insulation on at least three sides of each bar. The supporting means preferably includes an adhesive elastomeric material, at room temperature vulcanizing silicone elastomers, for example. The elastomeric material is disposed between the bottom of the slot and the bottom insulated conductor, between the bottom and top conductors, between the top conductor and the wedge, and between one side of each conductor and the corresponding side of the slot. I have found that the foregoing structure firmly positions the bars in place, even in the presence of dimension changes, effectively damps or absorbs vibration energy, and provides improved heat transfer from the conductors to the core. Additionally, a fillet of elastomeric material is advantageously disposed at the intersection of the conductors and the core slot at the top, in the case where the conductors are positioned vertically, to provide an additional resilient restraint against dropping of the conductors in the slots.

While the specification concludes with claims particularly pointing out and distinctly claiming the subject matter which I regard as my invention, it is believed the invention will be better understood from the following description taken in connection with the accompanying drawings in which:

Figure 1:
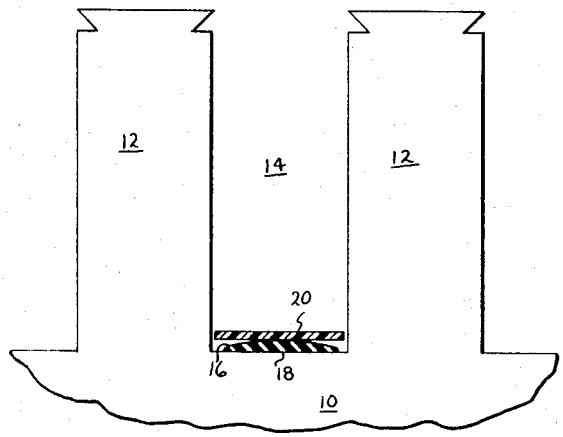
FIGURE 1 is a right cross-section view of a minor segment of a dynamoelectric machine armature illustrating initial preparation of a conductor-receiving slot in accord with an embodiment of the present invention.

The initial steps in fabrication of a conductor slot support system is accord with an embodiment of this invention are illustrated in FIGURE 1. The drawing shows a minor segment of a typical dynamoelectric machine armature core 10 having the usual circumferentially spaced teeth 12 defining slots, as slot 14, therebetween. It would not be uncommon for there to be hundreds of similar axially extending teeth and slots alternately spaced around a rotor-receiving cylindrical bore in core 10. The core 10 is fabricated from longitudinally stacked laminated steel stock, which construction tends to make a rough surface, relative to the molded smooth conductor insulation surface, along the external surfaces thereof, even after broaching or otherwise machining. Also, the stack customarily comprises a plurality of longitudinally spaced similar sections for providing radial cooling ducts through core 10, and the respective slots and teeth are therefore discontinuous, or segmental, in the longitudinal direction.

In accord with the invention, a body of resilient material 16 is positioned along, and advantageously bonded to, the bottom surface 18 of slot 14. Thereafter, a bottom slot filler strip 20 of hard electrical insulating material, as Textolite high-temperature, phenolic resin-bonded fabric reinforced laminate, for example, is pressed into the slot over the resilient material 16. The bottom support thus comprises a layer resilient material 16 sandwiched between the bottom surface 18 of the slot and a slot filler strip 20.

The resilient material 16, and other similar resilient material to be referred to hereinafter, can be any of a plurality of elastomeric silicones, for example, and is advantageously characterized by an initially putty-like consistency curable at room temperature to a cohesive resilient mass which adheres to surrounding surfaces. The resilient material must be able to provide a restoring force when compressed for long periods of time at normal operating temperature for the particular machine. That is, it must be of an elastic or elastomeric, as distinguished from a plastic, nature. Such a material, and the presently preferred material for this use, is RTV102 manufactured by General Electric Company. Adding carbon black to this and similar materials readily provides an electrically conductive resilient material when desired, as in particular applications to be hereinafter identified.

The resilient material can be applied to the slot by hand or spatula, or pasted or buttered upon the bottom surface of strip 20. Preferably, a bead of material 16 is drawn down the bottom center of slot 14 with an air-pressure caulking gun. Applying material 16 initially to one or both sides of strip 20 is effective in providing the bottom support structure of the invention.

Figure 2:
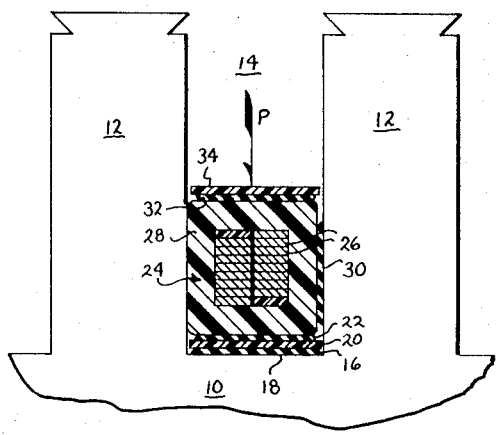
FIGURE 2 is a view similar to that of FIGURE 1, illustrating placement of the bottom conductor in the slot.

In FIGURE 2, a layer of resilient material 22 has been applied to the top of filler strip 20 and bottom conductor 24 has been inserted in slot 14. Conductor 24 is conventionally fabricated of multiple insulated copper strands as 26, surrounded by a rigid and hard, thermo-set, ground insulation wall 28. The material of wall 28 can include a cured epoxy resin, for example.

Prior to positioning of bar 24 in slot 14, resilient material 30 is applied to at least one side wall thereof, either continuously or at intervals but preferably by buttering patches thereon at longitudinally spaced intervals, for example two-foot intervals. In the event that both sides of conductor 24 are coated, it is best to use a conductive resilient materal on at least one side in order to ensure grounding the exterior of insulation wall 28 to core 10. After conductor 24 is positioned in slot 14, a body of resilient material 32 is applied to the top surface of conductor 24, a filler strip 34 is inserted in slot 14, and pressure is applied to the top of the filler stip 34, thereby seating conductor 24 tightly in the slot by means of the resilient support system provided.

Figure 3:
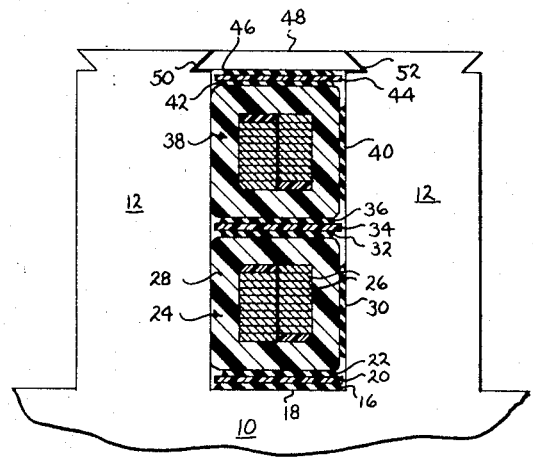
FIGURE 3 is a view similar to that of FIGURES 1 and 2 taken after completion of the conductors and slot assembly.

The finished assembly of FIGURE 3 is completed by a layer of resilient material 36 applied to the top surface of intermediate filler strip 34, insertion of top conductor 38 (which is similar in construction to bottom conductor 24) after applying resilient material 40 to at least one side thereof, coating the top surface of conductor 38 with resilient material 42, inserting top filler strip 44 and applying radially outwardly a force thereto to seat conductor 38. Thereafter resilient material 46 is applied to the top of strip 44 and wedge 48 is longitudinally driven into the corresponding side grooves 50 and 52, providing the top support member for the resilient conductor mounting system.

Figure 4:
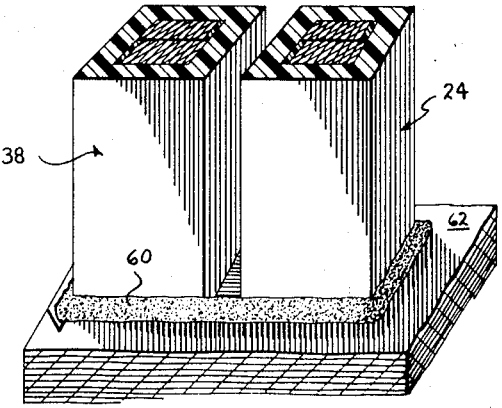
FIGURE 4 is a side view of the region where the conductors emerge from the slots in one end of the armature core.

A fillet, or bead, of resilient material is advantageously provided at the end of the core where the conductors emerge from the slot into the end turn region. This is shown in FIGURE 4, wherein the resilient material is designated at 60, and 62 represents the end surface of the core 10. The resilient material 60 provides a flexible restraint against downward conductor movement, in the case where the conductors are positioned vertically. Because the material 60 adheres to the external surfaces of conductors 24 and 38, it is pulled downwardly into the narrow space between the conductors and slot, upon slight downward displacement of the conductors, and serves there as a blocking wedge to assist in holding the conductors in place against further tendency to move. Material 60 is best selected to be non-conducting in order not to interfere with the voltage gradient coating customarily applied to the conductors in the vicinity of their emergence from the core.

Resilient material 60 additionally provides a seal, or dam, and serves as a vibration damper and shock absorber. Accordingly, similar beads of resilient material are also advantageously provided at the bottom of the core. The resilient restraint resists the tendency to shatter or crack, which was a problem with some former more rigid coil support systems in the vicinity of conductor egress from the slots, particularly when the machine is subjected to short circuit or other unusually severe operating conditions. Furthermore, by completely encircling the conductors, at their exits from the core, with resilient material, a wedge dam is also provided that ensures that the wedges do not become longitudinally displaced in their keyways.

In the support system illustrated in FIGURE 3, the filler strip 20 and layers 16 and 20 of resilient material on either side thereof provide a resilient liner in the bottom of the slot. Filler strip 34 and resilient material 32 and 36 similarly provide resilient spacer means disposed between and separating conductors 24 and 38. Also in like manner, filler strip 44 and resilient layers 42 and 46 provide a resilient pad on the outermost conductor 38 adapted to be engaged by wedge 48.

The resilient bottom liner, spacer and top pad are each separate, or distinct, one from the other, to provide a support system wherein the conductors are resiliently restrained against movement in the radial direction relative to the slot and relative to each other. The independent resilient suspension gives the energy dissipating advantage of a system comprised of smaller masses, as opposed to a single larger mass represented by both bars moving in unison. Also, a compressible cushion is provided for the relatively frangible radial surfaces of the conductor insulating wall.

The laminated structure shown is preferred, wherein a strip of flat insulating stock is bonded intermediate top and bottom layers of resilient material. With this construction, the resilient material is initially applied in the uncured, or relatively viscous or thixotropic state, and flows under compression to conform to and adhesively bond against all contacted surfaces. In this connection, it should be noted that the layers of resilient material illustrated are shown with greater thickness, for clarity, than would ordinarily be the case with the laminated construction.

The foregoing is a description of an illustrative embodiment of the invention, and it is applicant's intention in the appended claims to cover all forms which fall within the scope of the invention.

What I claim as new and desire to secure by Letters Patent of the United States is:

1. A dynamoelectric machine armature comprising:
   (a) a laminated core having an axis and a plurality of parallel open slots of substantially rectangular cross section circumferentially spaced in said core about said axis;
   (b) a plurality of coil side conductors in one of said slots spaced from each other in the radial direction, said conductors each having a rigid wall insulation; and (c) a resilient liner in the bottom of said slot, resilient spacer means distinct from said liner disposed between and separating said conductors, a resilient pad on the outermost conductor engaged by a wedge receivable longitudinally in the top of said slot, so that said conductors are resiliently restrained against movement in the radial direction relative to said slot and relative to each other, and resilient material bonded to said core and to the external surfaces of said conductors on at least one end of said core in the region where said conductors project from the slot.

2. The machine of claim 1 wherein layers of resilient material, distinct from said resilient liner said resilient spacer and said resilient pad, are disposed between at least one side of said conductors and a side wall of said slot.

3. The machine of claim 1 wherein said conductors project axially beyond said slots in the core and an individual ring of resilient material is provided encircling each conductor and bonded to the core at least at one end of the core.

References Cited

FOREIGN PATENTS 1,316,828  12/1962  France.

MILTON O. HIRSHFIELD, *Primary Examiner.*

R. SKUDY, *Assistant Examiner.*